Figure 1:
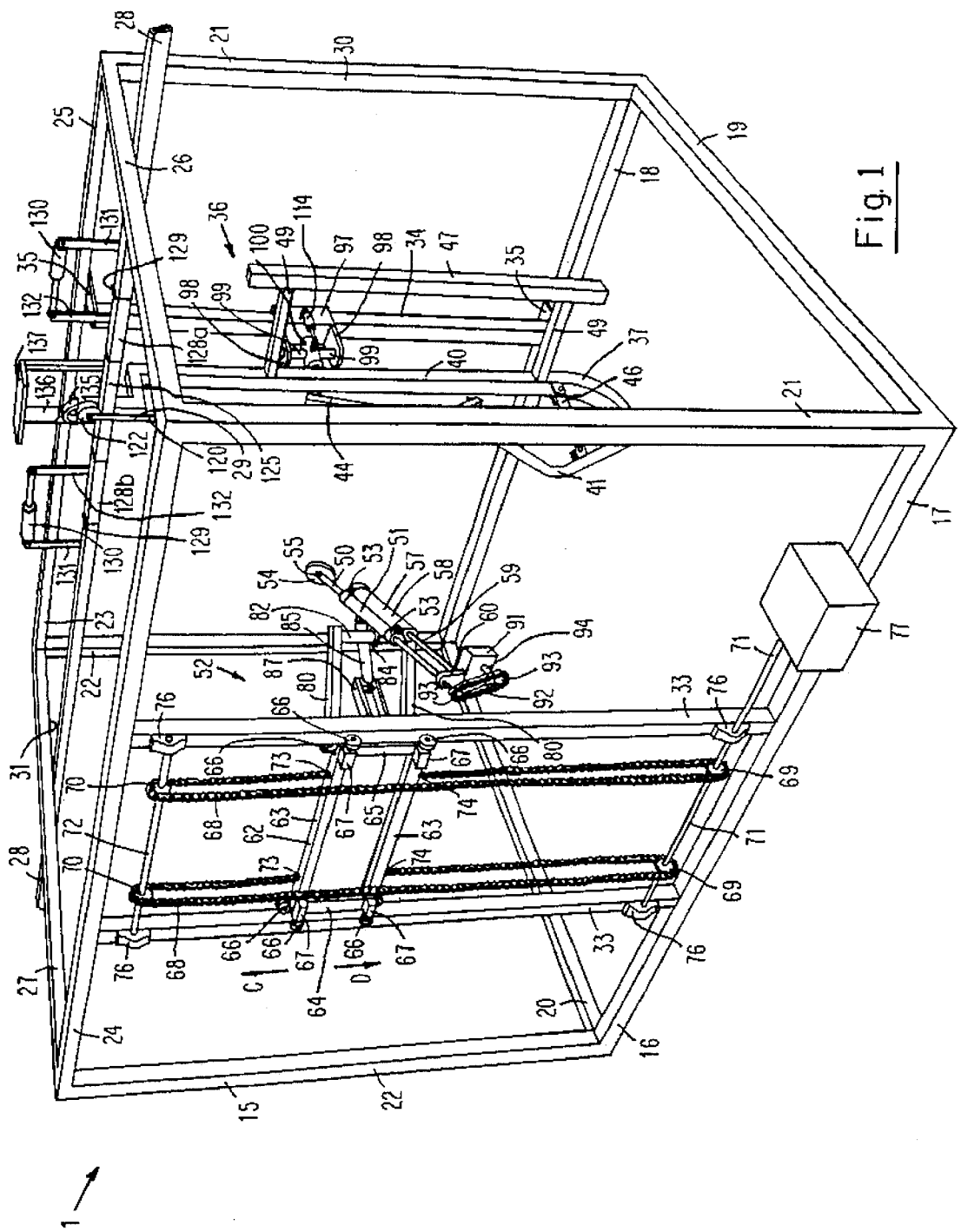

United States Patent [19]
Sheedy et al.

[11] Patent Number: 5,542,878
[45] Date of Patent: Aug. 6, 1996

[54] METHOD AND APPARATUS FOR SEPARATING MEAT FROM A BONE OF AN ANIMAL CARCASS

[75] Inventors: Thomas F. Sheedy, Kilmallock; Martin J. Finucane, Kilrush, both of Ireland

[73] Assignee: Concept International Limited, Dublin, Ireland

[21] Appl. No.: 406,867

[22] PCT Filed: Sep. 23, 1993

[86] PCT No.: PCT/IE93/00051

§ 371 Date: Mar. 23, 1995

§ 102(e) Date: Mar. 23, 1995

[87] PCT Pub. No.: WO94/06302

PCT Pub. Date: Mar. 31, 1994

[30] Foreign Application Priority Data

Sep. 23, 1992 [IE] Ireland .................. S922680

[51] Int. Cl.⁶ .................. A22C 17/04
[52] U.S. Cl. .................. 452/135; 452/160; 452/171
[58] Field of Search .................. 452/135, 149, 452/171, 160

[56] References Cited

U.S. PATENT DOCUMENTS

| | | |
|---|---|---|
| 3,546,737 | 12/1970 | Neebel . |
| 3,553,770 | 1/1971 | Ford .................. 452/171 |
| 4,134,181 | 1/1979 | Schneider . |
| 4,651,384 | 3/1987 | Korhonen . |
| 5,226,850 | 7/1993 | Klaasen .................. 452/135 |
| 5,302,149 | 4/1994 | Witham et al. .................. 452/135 |

FOREIGN PATENT DOCUMENTS

| | | |
|---|---|---|
| 0121477 | 10/1984 | European Pat. Off. . |
| 0258939 | 3/1988 | European Pat. Off. . |
| 0365453 | 4/1990 | European Pat. Off. . |
| 0469680 | 2/1992 | European Pat. Off. . |
| 0502581 | 9/1992 | European Pat. Off. . |
| 217414 | 1/1985 | Germany .................. 452/160 |
| 9103163 | 3/1991 | WIPO . |

OTHER PUBLICATIONS

Patent Abstracts of Japan, vol. 14, No. 109 (C–695)(4052), Feb. 28, 1990 (JP,A,01 312,962 Dec. 18, 1989).

*Primary Examiner*—Willis Little
*Attorney, Agent, or Firm*—Lowe, Price, LeBlanc & Becker

[57] ABSTRACT

Apparatus (1) for separating meat (2) from ribs (3) of a carcass side (4) comprises a main framework (15). A clamp (37) mounted within the main framework (15) clamps and supports the carcass side (4). A carriage (62) vertically slidable in the main framework (15) carries a cylindrical housing (51) within which a carrier arm (50) is longitudinally slidable. A carcass engaging disc (54) is rotatably carried at the end of the carrier arm (50) and is moved by a ram (57) into engagement between adjacent ribs (3) for rupturing a membrane (8) and urging the meat (2) from the ribs (3). The housing (51) is pivoted about a spindle (82) by a hydraulic ram (85) for moving the carcass engaging disc (54) along the ribs (3).

12 Claims, 8 Drawing Sheets

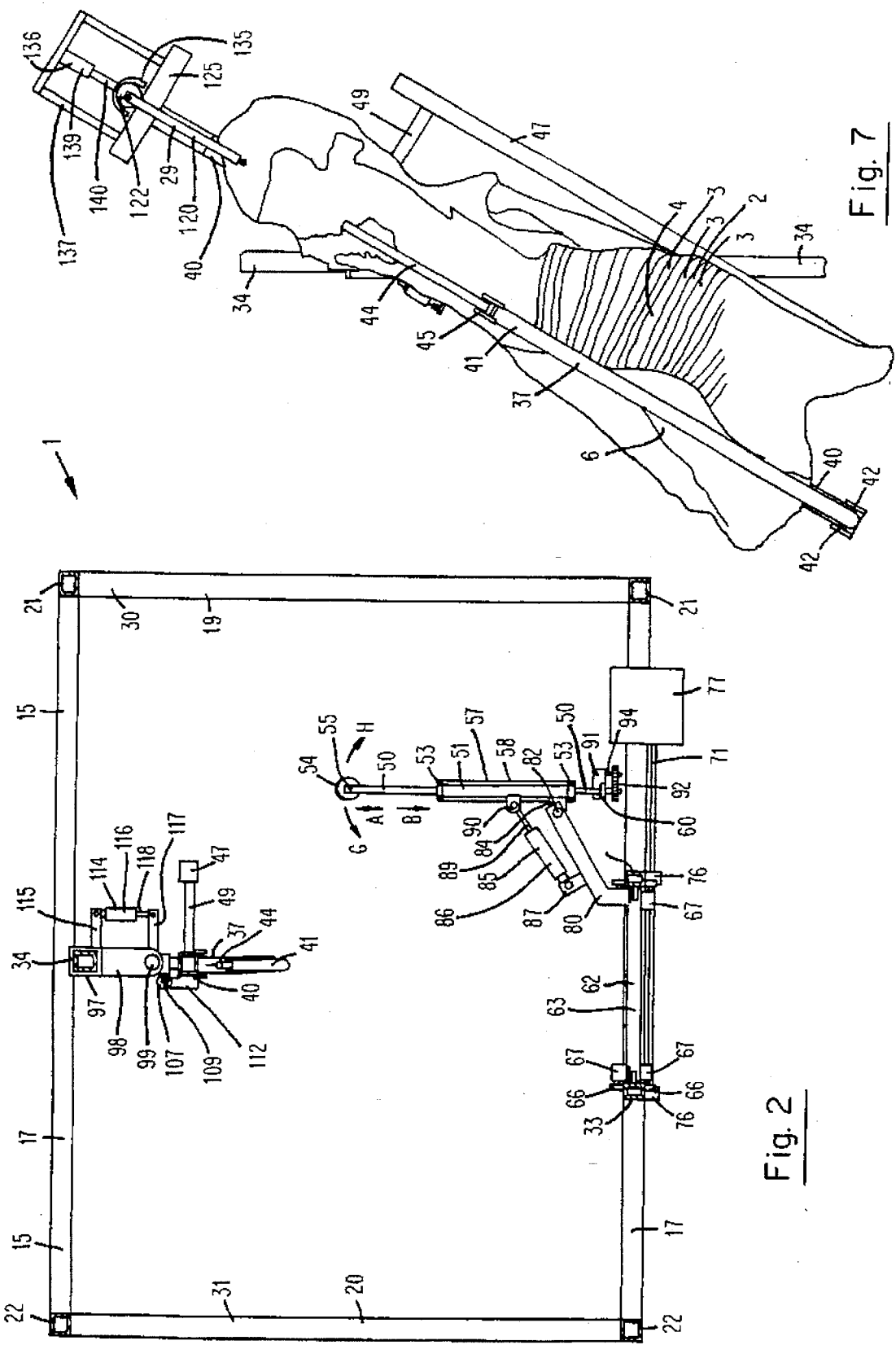

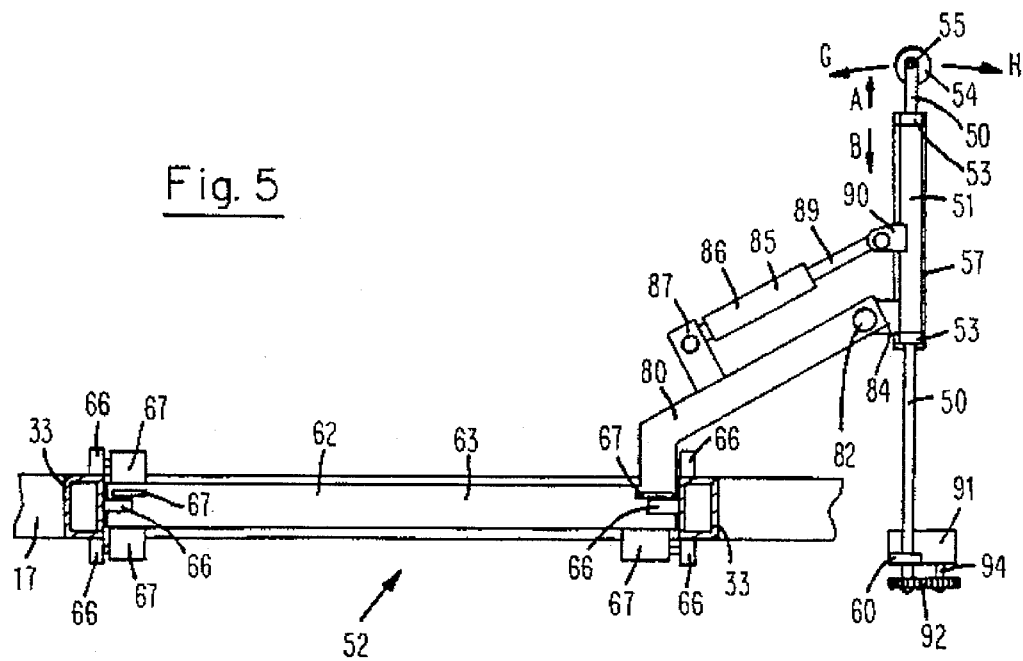
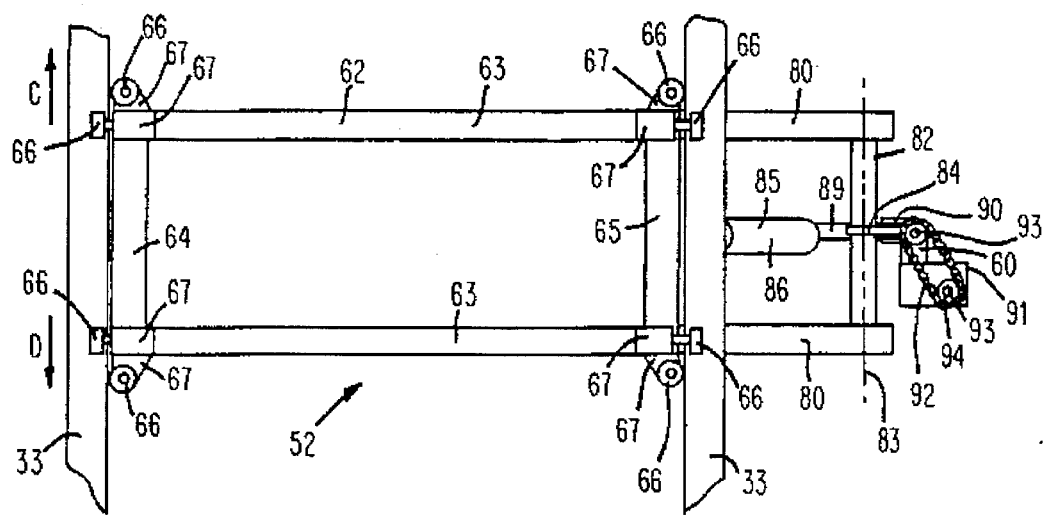
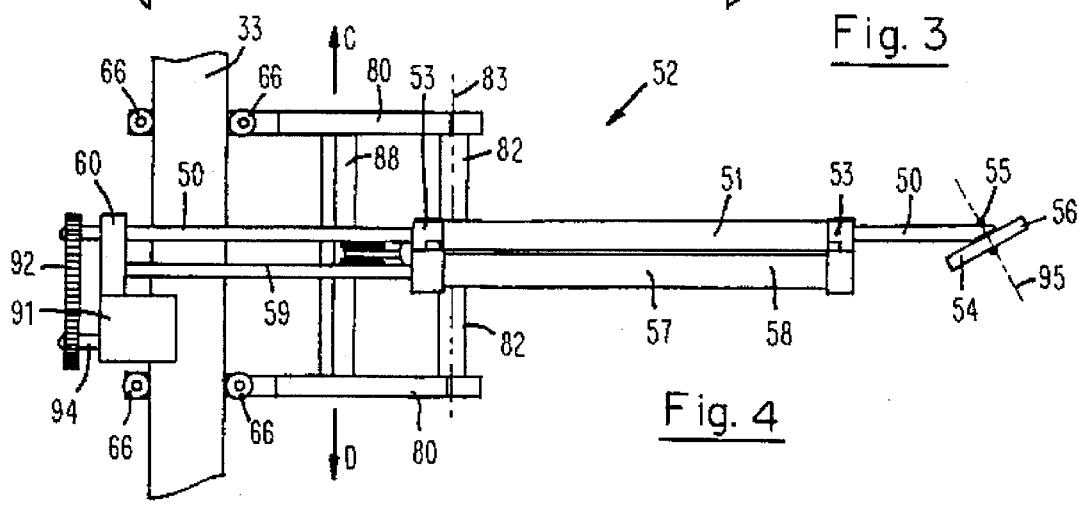

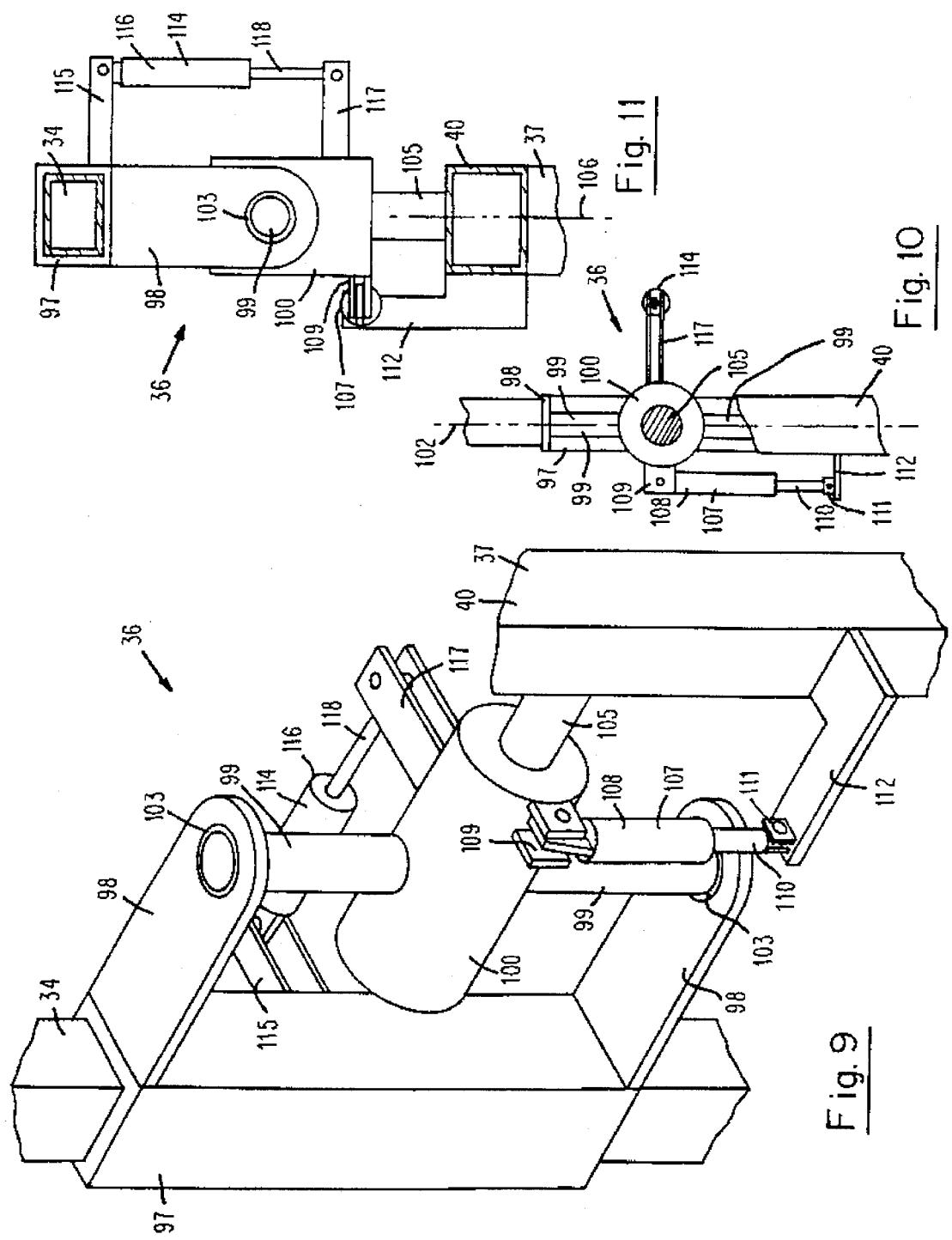

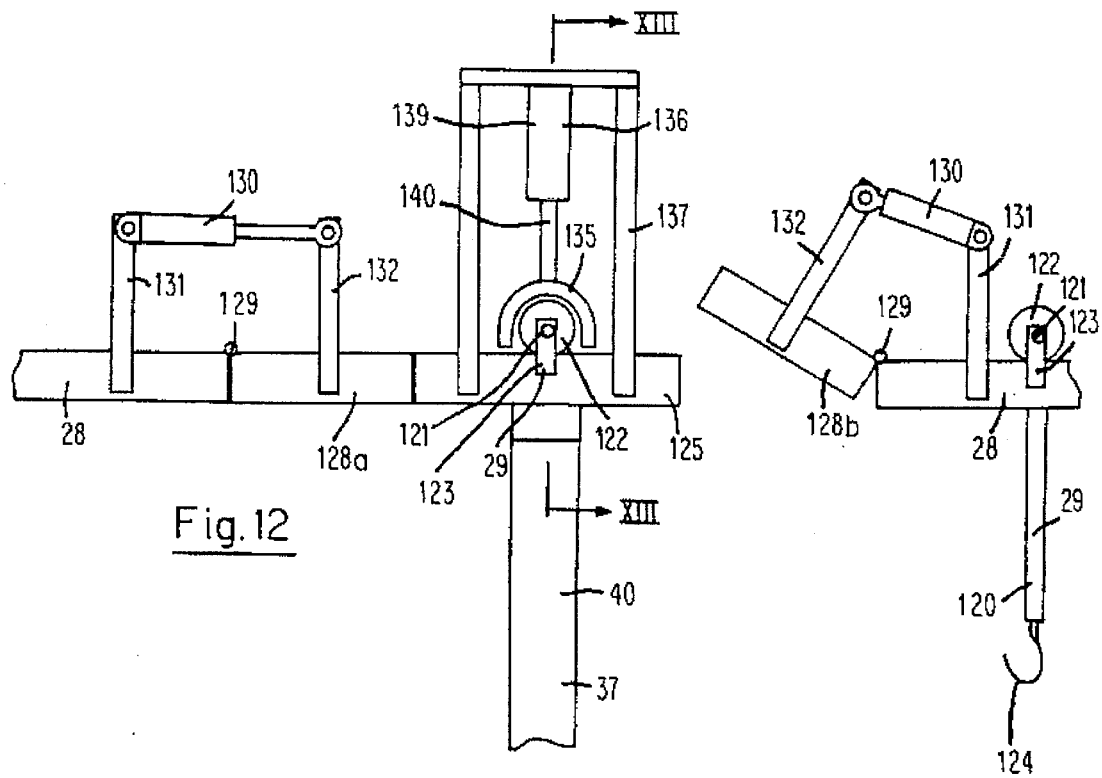
Fig. 12
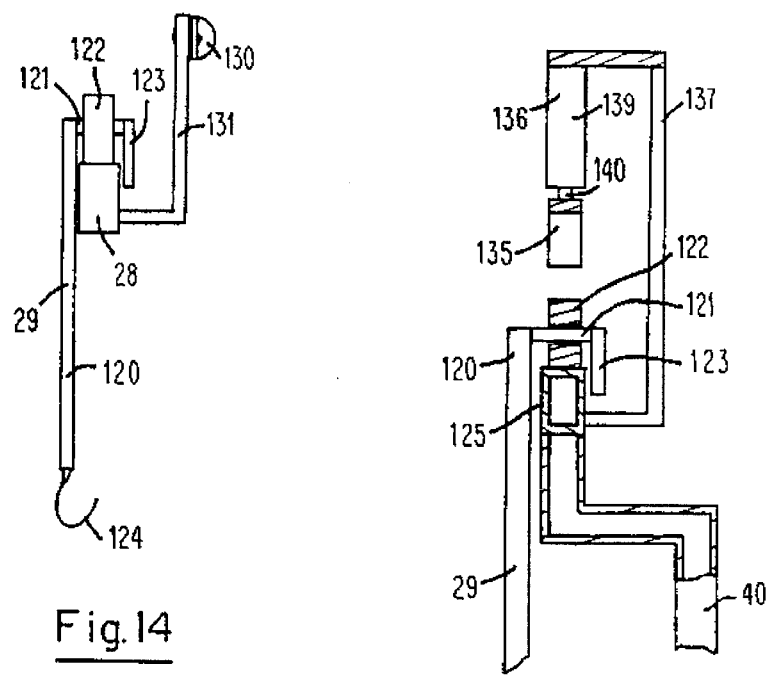
Fig. 14
Fig. 13

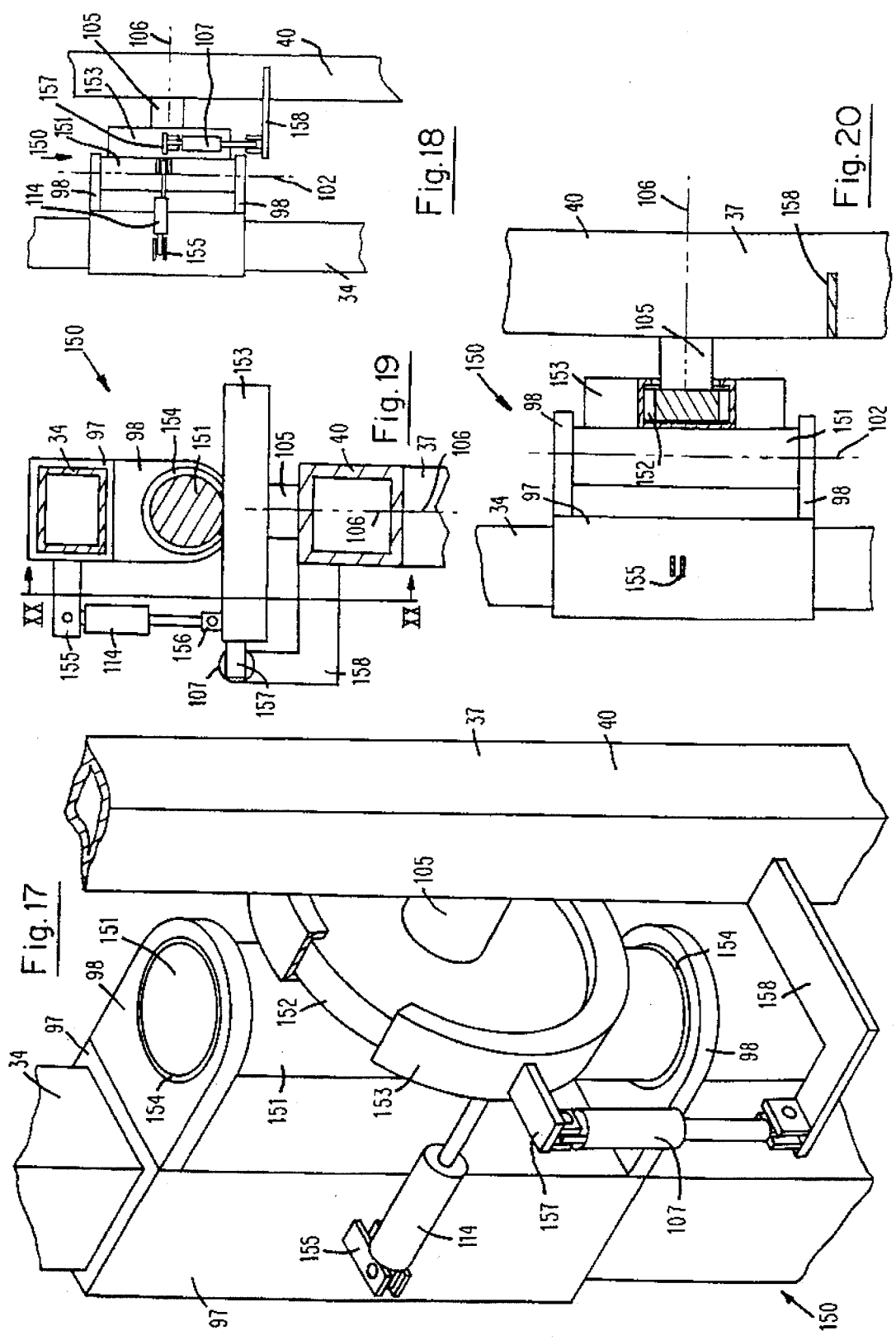

METHOD AND APPARATUS FOR SEPARATING MEAT FROM A BONE OF AN ANIMAL CARCASS

The present invention relates to an apparatus and a method for separating meat from a bone of an animal carcass, and in particular, though not limited to an apparatus and a method for separating meat from the ribs of a carcass side.

In the processing of animal carcasses in a meat factory, it is necessary to remove the meat from the bones of the animal carcass, this operation, in general, is referred to as de-boning the meat. In general, the animal carcass is normally presented to the operator, normally, referred to as a de-boner in the form of a half carcass which is commonly referred to as a carcass side. For convenience, the carcass side is further halved by cutting the carcass side transversely between a pair of ribs intermediate the front and rear legs. The two halves thus formed are referred to as quarters, namely, a front and hind quarter. To remove the meat from the front and hind quarters, the quarters are presented to the operator, generally, suspended from a hook carried on a carrier element which is rollable on an overhead conveyor track. The operator with a knife, manually cuts and separates the meat from the bones of the carcass, which include the spine bone and ribs. In general, it is relatively easy to cut and separate the meat from the spine bone. However, considerable difficulty is encountered in cutting and separating the meat from the ribs. A double membrane which comprises an inner and outer membrane securely attaches the meat to the ribs. The inner and outer membranes are secured along join lines which extend between and parallel to the ribs and define pockets for accommodating the ribs. The membranes as well as being secured to each other and to the meat, are also securely attached to the ribs. In order to remove the meat from a rib, the de-boner must first of all cut the membranes along each side of the rib, and then insert a knife between a pair of adjacent ribs and behind one of the ribs to cut the meat either from the inner membrane or to separate the inner membrane from the rib. This is a particularly difficult, tedious and time consuming, as well as a dangerous task, ant in many instances, can result in serious wounds being inflicted on the hands, fingers and other parts of the body of the operator. Additionally, meat is left behind on the bones which is wasted.

There is therefore a need for an apparatus and method for separating meat from a bone of an animal carcass, and in particular, for separating meat from the ribs of a carcass side.

The present invention is directed towards providing such an apparatus and method.

According to the invention there is provided apparatus for separating meat from a bone of an animal carcass, the apparatus comprising a main support means, a clamp means for holding and supporting at least a portion of an animal carcass, the clamp means being mounted on the main support means, a carcass engaging means for engaging the carcass portion for urging the meat from the bone, the carcass engaging means being mounted on the main support means, at least one of the carcass engaging means and the clamp means being movable relative to the other for urging the carcass engaging means into engagement with the carcass portion, and a first drive means for moving one of the carcass engaging means and the clamp means for engaging the carcass engaging means with the carcass portion for urging the meat from the bone.

The advantages of the invention are many. The most important advantage of the invention is that it enables meat to be readily easily separated from a bone, for example, the ribs of a carcass side with minimal manual intervention. Furthermore, the apparatus according to the invention avoids the need to divide the carcass side into quarters, which considerably improves the efficiency with which meat can be removed from the carcass side. It has also been found that use of the invention enables considerably more meat to be removed from the ribs of a carcass side than has been possible heretofore. The ribs are substantially striped clean of all meat by using the apparatus.

In one embodiment of the invention the carcass engaging means is movable relative to the main support means towards the clamp means for engaging and urging meat from the bone. Preferably, the carcass engaging means is movable relative to the main support means along a path of movement along the bone. This enables the meat to be continuously removed from the bone.

In another embodiment of the invention a second drive means is provided for moving the carcass engaging means along the path of movement along the bone. This feature of the invention provides a particularly efficient apparatus.

In another embodiment of the invention the carcass engaging means is movable transversely of the bone from one bone to another adjacent bone. This feature of the invention enables the apparatus to handle a relatively large carcass portion, for example, a carcass side.

Preferably, a third drive means is provided for moving the carcass engaging means transversely of the bone.

In one embodiment of the invention the carcass engaging means is carried on one end of an elongated carrier arm, the carrier arm being pivotal about a main pivot axis at a location spaced apart from the carcass engaging means for accommodating movement of the carcass engaging means along the path of movement along the bone. This feature provides a relatively efficient construction of apparatus.

In another embodiment of the invention a first mounting means mounts the carcass engaging means to the main support means, the carrier arm being pivotally connected to the first mounting means about the main pivot axis.

In another embodiment of the invention the carrier arm is longitudinally slidable in a housing for accommodating movement of the carcass engaging means towards the clamp means, the housing being pivotally connected to the first mounting means about the main pivot axis. Preferably, the first drive means moves the carrier arm along its longitudinal axis in the housing. Advantageously, the second drive means pivots the carrier arm about the main pivot axis.

In a further embodiment of the invention the first mounting means is movably mounted to the main support means and is movable relative to the main support means in a direction parallel to the main pivot axis for moving the carcass engaging means from one bone to the next adjacent bone. Preferably, the third drive means moves the first mounting means in a direction parallel to the main pivot axis. In one embodiment of the invention the carrier arm is pivotally mounted in the housing about its longitudinal axis for altering the disposition of the carcass engaging means relative to the carcass portion. Preferably, a fourth drive means is provided for pivoting the carrier arm in the housing.

Preferably, the carcass engaging means is a carcass engaging disc. Advantageously, the carcass engaging disc is a circular disc.

Advantageously, the carcass engaging disc is rotatably mounted about a rotational axis coinciding with its central axis. Preferably, the rotational axis of the carcass engaging disc is disposed relative to the main pivot axis between a position extending parallel to the main pivot axis and extending at an angle of 75° to the main pivot axis when the rotational axis and the main pivot axis lie in a common plane. Advantageously, the rotational axis of the carcass engaging disc extends at an angle of approximately 30° to the main pivot axis when the rotational axis and the main pivot axis lie in a common plane.

In one embodiment of the invention the main support means comprises a first support means, the first mounting means being mounted on the first support means. Advantageously, the first support means extends in a generally vertical direction, and the first mounting means is movable in a general vertical direction relative to the first support means parallel to the main pivot axis.

In another embodiment of the invention the clamp means is pivotally connected to the main support means about a first secondary pivot axis which extends perpendicularly to the main pivot axis for alighting a bone with the path of movement of the carcass engaging means. Preferably, the clamp means is pivotally connected to the main support means about a second secondary pivot axis perpendicular to the first secondary pivot axis for aligning the carcass portion with the path of movement of the carcass engaging means. Advantageously, a second mounting means is provided for mounting the clamp means to the main support means about the first and second secondary pivot axes. Preferably, the main support means comprises a second support means located rigidly relative to the first support means, the second mounting means mounting the clamp means to the second support means. Preferably, the second support means extends in a general vertical direction.

In one embodiment of the invention the first and second support means are spaced apart from each other and the clamp means and the carcass engaging means are located intermediate the first and second support means.

In another embodiment of the invention the clamp means supports the carcass portion intermediate the clamp means and the carcass engaging means. In one embodiment of the invention the carcass engaging means is for engaging a carcass portion adjacent a rib thereof for urging the meat from the rib.

In another embodiment of the invention the clamp means supports the carcass portion so that the inner side of the carcass portion is presented to the carcass engaging means.

In a further embodiment of the invention the clamp means supports the carcass portion with the ribs extending substantially horizontally, and the main pivot axis extends substantially vertically. Preferably, the carcass engaging means ruptures a membrane retaining the meat to the bone. Advantageously, the carcass engaging means is provided with a cutting edge for rupturing the membrane.

In one embodiment of the invention the first drive means comprises a first ram. Preferably, the first ram is an hydraulic ram.

In another embodiment of the invention the clamp means comprises an elongated carcass abutting member and a clamping member co-operating with the carcass abutting member for clamping the carcass portion to the carcass abutting member. Advantageously, the carcass abutting member is pivotally connected to the second mounting means about the first and second secondary pivot axes. Preferably, the clamp means is for supporting a carcass side.

In another embodiment of the invention a receiving means is provided on the clamp means for co-operating with an external conveyor means for receiving a carrier element of the conveyor means for transferring a carcass portion from the conveyor means to the clamp means. Preferably, the receiving means is releasably co-operable with the conveyor means. Advantageously, a retaining means is provided for retaining a carrier element located on the receiving means. Preferably, the receiving means is mounted on the carcass abutting member.

Additionally the invention provides a method for separating meat from a bone of a portion of an animal carcass using the apparatus according to the invention, the method comprising the steps of supporting the carcass portion in the clamp means, urging the carcass engaging means into engagement with the meat adjacent the bone, and further urging the carcass engaging means for urging the meat from the bone.

In one embodiment of the invention the method further comprises the step of moving the carcass engaging means along a path of movement along the bone simultaneously while the carcass engaging means is being urged against the meat for continuously and progressively urging the meat from the bone along the length thereof. In another embodiment of the invention the carcass engaging means is moved along and adjacent one side of the bone for urging the meat therefrom.

Preferably, the method comprises the step of urging the carcass engaging means into engagement with a membrane attaching the meat to the bone, the carcass engaging means being urged into engagement with the membrane adjacent the bone.

Advantageously, the carcass engaging means ruptures the membrane attaching the meat to the bone.

In one embodiment of the invention the carcass engaging means cooperates with the bone for rupturing the membrane.

In another embodiment of the invention the carcass engaging means is moved along and adjacent a side of the bone for rupturing a membrane attaching the meat to the bone.

Figure 8:
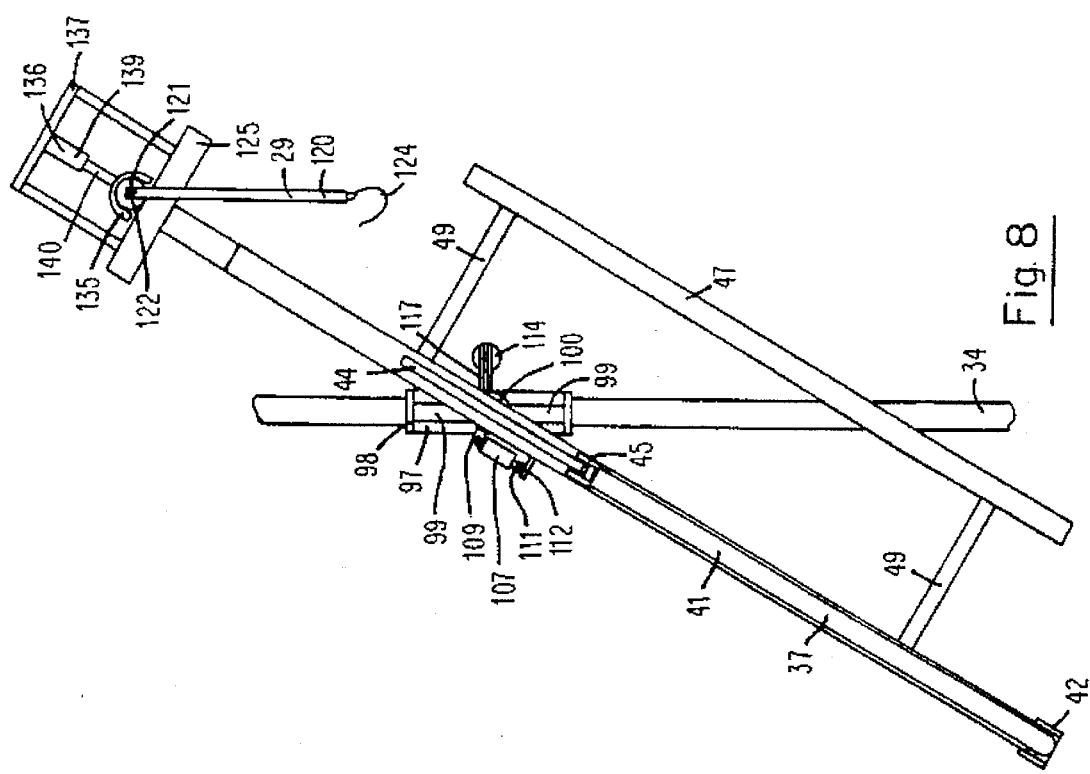
Figure 6:
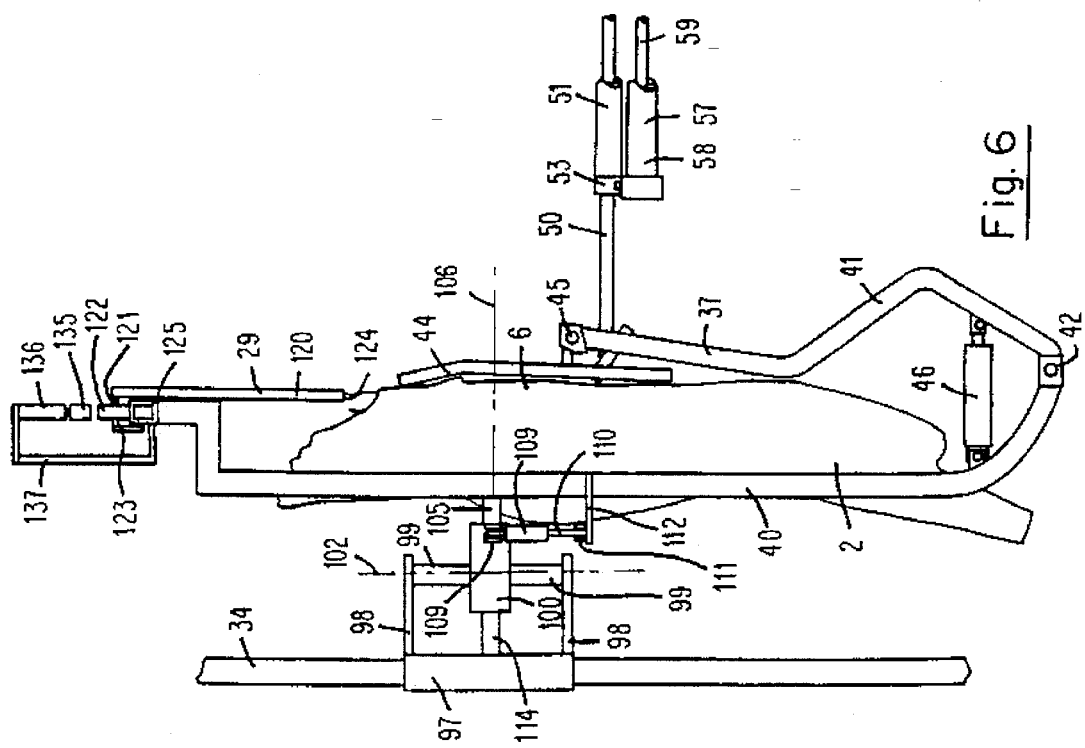
Figures 15, 16:
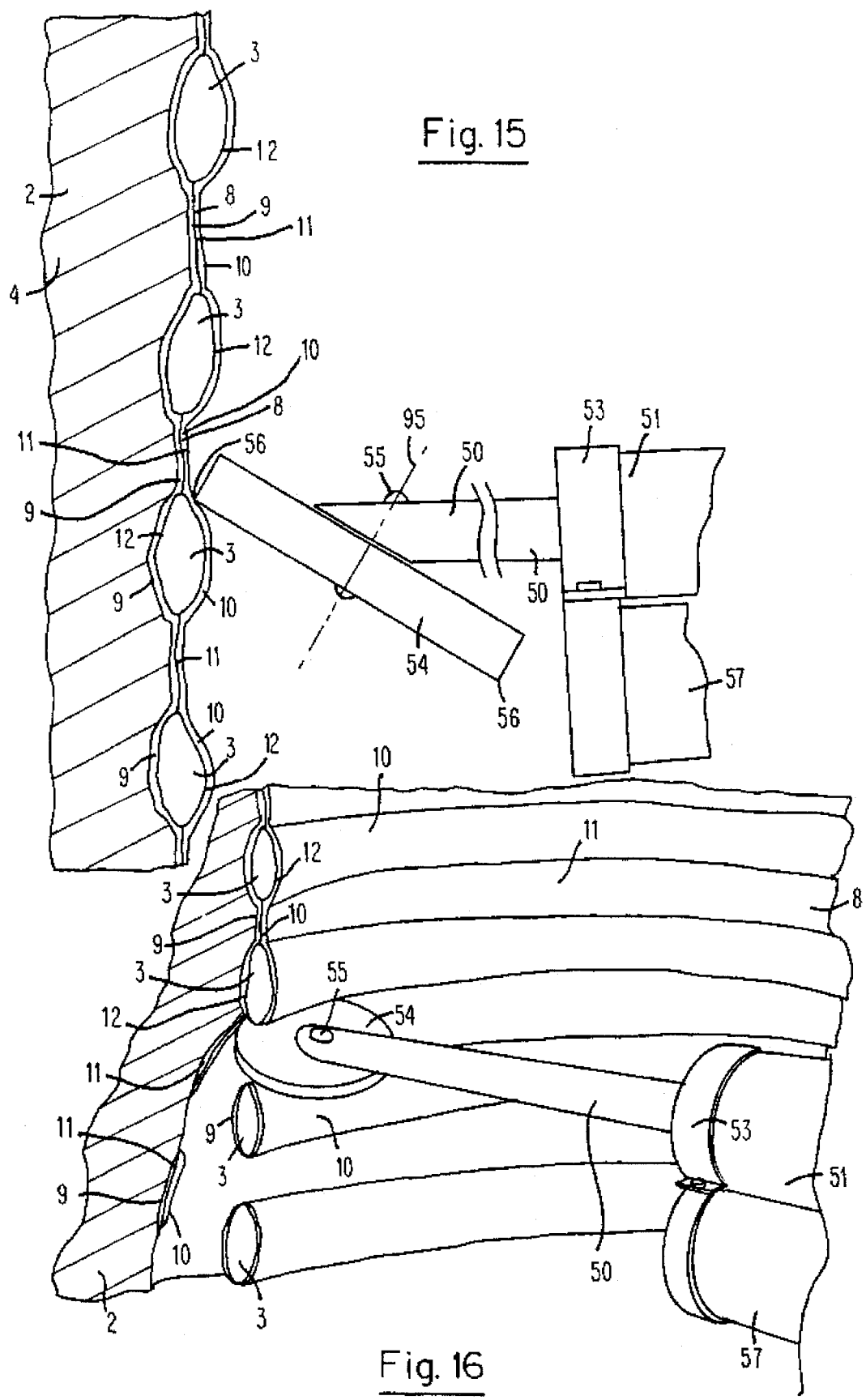

In one embodiment of the invention the carcass engaging means engages a double membrane attaching the meat to a rib for urging the meat from the rib. Advantageously, the carcass engaging means engages the double membrane adjacent the rib for rupturing The invention will be more clearly understood from the following description of some preferred embodiments thereof given by way of example only with reference to the accompanying drawings, in which:

FIG. 1 is a perspective view of apparatus according to the invention for separating meat from a bone of portion of an animal carcass, FIG. 2 is a cross-sectional plan view of the apparatus of FIG. 1, FIG. 3 is a front elevational view of portion of the apparatus of FIG. 1, FIG. 4 is an end elevational view of the portion of FIG. 3 of the apparatus of FIG. 1, FIG. 5 is a plan view of the portion of FIG. 3 of the apparatus of FIG. 1, FIG. 6 is an end elevational view of another portion of the apparatus of FIG. 1, FIG. 7 is a front elevational view of the portion of FIG. 6 of the apparatus of FIG. 1, FIG. 8 is a front elevational view of the portion of FIG. 6 of the apparatus of FIG. 1, FIG. 9 is a perspective view of a detail of the apparatus of FIG. 1, FIG. 10 is a partly cut-away partly sectional front elevational view of the detail of FIG. 9 of the apparatus of FIG. 1, FIG. 11 is a plan view of the detail of FIG. 9 of the apparatus of FIG. 1, FIG. 12 is a rear elevational view of another detail of the apparatus of FIG. 1, FIG. 13 is a partly sectional end elevational view of the detail of FIG. 12 on the line XIII—XIII of FIG. 12, FIG. 14 is an end elevational view of portion of the detail of FIG. 12, FIG. 15 is a sectional end elevational view of portion of an animal carcass side illustrating the operation of the apparatus of FIG. 1, FIG. 16 is a perspective view of a section of the carcass side of FIG. 15 illustrating portion of the apparatus of FIG. 1 in use, FIG. 17 is a perspective view of a detail of apparatus according to another embodiment of the invention for separating meat from a bone of portion of an animal carcass, FIG. 18 is an end elevational view of the detail of FIG. 17, FIG. 19 is a partly sectional plan view of the detail of FIG. 17, and FIG. 20 is a cross-sectional end elevational view of the detail of FIG. 17 on the line XX—XX of FIG. 19.

Referring to the drawings and initially to FIGS. 1 to 16 there is illustrated apparatus according to the invention indicated generally by the reference numeral 1 for separating meat 2 from a bone, namely, ribs 3 of portion of an animal carcass, in this case, a carcass side 4. Before describing the apparatus 1 in detail, the relevant aspects of the carcass side 4 will first be described. It is however, expected that those skilled in the art will be familiar with a carcass side. Referring in particular to FIGS. 7, 15 and 16 amongst other items, the carcass side 4 comprises a spine portion 6 extending substantially the length of the carcass side 4. The ribs 3 extend from the spine 6. The meat 2 is retained on the ribs 3 by a double membrane 8 which is formed by an inner membrane 9 to which the meat 2 is attached and an outer membrane 10. The membranes 9 and 10 are joined to each other along longitudinally extending join lines 11 which extend parallel to and between the ribs 3. Pockets 12 extend between the join lines 11 for accommodating the ribs 3. Both the inner and outer membranes 9 and 10, respectively, are relatively, tightly attached to the ribs 3.

Turning now to the apparatus 1, the apparatus 1 comprises a main support means, in this case provided by a main support framework 15 of box section steel. The main support framework 15 comprises a base frame 16 comprising a pair of side members 17 and 18 joined by end members 19 and 20. Four uprights, namely, one pair of uprights 21 and a second pair of uprights 22 extend upwardly from the base frame 16 to a top frame 23 having side members 24 and 25 joined by end members 26 and 27. A conveyor track 28 supports roller carrier elements 29 from which the carcass sides 4 are suspended. The conveyor track 28 and carrier elements 29 will be known to those skilled in the art, however, they are described in more detail below. Each carcass side 4 from which the meat 2 is to be urged from the ribs 3 is delivered into the main support framework 15 on the conveyor track 28 through an input opening 30 formed by the end members 19 and 26 and by the uprights 21. Each carcass side 4 is delivered from the main support framework 15 on the conveyor track 28 through an output opening 31 formed by the end members 20 and 27 and the uprights 22. First support means is formed in the main support framework 15 by a pair of first support members 33 which extend vertically between the side members 17 and 24 for a purpose to be described below. Second support means also for a purpose to be described below is formed in the main support framework 15 by a vertically extending second support member 34 extending between the side members 18 and 25 and secured thereto by brackets 35.

Second mounting means comprising a second mounting assembly indicated generally by the reference numeral 36 mounts a clamping means comprising a clamp 37 for receiving and supporting the carcass side 4 to the second support member 34 while the meat 2 is being separated from the ribs 3. The second mounting assembly 36 will be described in more detail below. The clamp 37 of stainless steel comprises an elongated carcass abutment member 40 carried on the second mounting assembly 36. A clamping member 41 pivotally connected by a pivot pin 42 to the abutment member 40 and co-operating with the abutment member 40 clamps the carcass side 4 with the outer side of the carcass side 4 abutting the abutment member 40. A spine engaging member 44 pivotally connected to the clamping member 41 by a pivot pin 45 engages the spine portion 6 of the carcass side 4 for securing the carcass side 4 against the abutment member 40. A double acting hydraulic ram 46 is pivotally connected to the abutment member 40 and the clamping member 41 and operates the clamping member 41 between an open position disengaged from the carcass side 4 to a closed position with the spine engaging member 44 tightly engaging the carcass side 4. A locating member 47 rigidly connected by a pair of connecting members 49 to the abutment member 40 supports and locates the carcass side 4 in the clamp 37. The locating member 47 engages the carcass adjacent a shoulder portion 48 thereof.

An elongated carrier arm 50 of stainless steel is longitudinally slidable and pivotal about its longitudinal axis in a cylindrical housing 51 which is in turn mounted to the first support member 33 by a first mounting means provided by a first mounting assembly 52 as will be described below. A carcass engaging means comprising a circular carcass engaging disc 54 of stainless steel is rotatably carried on a spindle 55 located at one end of the carrier arm 50 for cutting and rupturing the double membrane 8 securing the meat 2 to the ribs 3 of the carcass side 4, and for urging the meat 2 from the ribs 3. A peripheral cutting edge 56 extending completely around the disc 54 facilitates in rupturing of the double membrane 8. A first drive means comprising a double acting first hydraulic ram 57 mounted on the housing 51 by brackets 53 drives the carrier arm 50, and in turn, the carcass engaging disc 54 in the directions of the arrows A and B for urging the carcass engaging disc 54 into and out of engagement with the carcass side 4, and in particular, into engagement with the double membrane 8 adjacent the join lines 11. Additionally, the hydraulic ram 57 urges the carcass engaging disc 54 further into the carcass side 4 between the ribs 3 for rupturing the double membrane 8 adjacent the join lines 11 and for urging the meat 2 from the ribs 3. This is described in more detail below. The first hydraulic ram 57 comprises a cylindrical housing 58 which is secured to the housing 51 by the brackets 53. A piston rod 59 extending from the cylindrical housing 58 terminates in a connecting bracket 60 which is secured thereto and is engaged with and located at a fixed location on the carrier arm 50 for sliding the carrier arm 50 in the housing 51 in the direction of the arrows A and B.

Returning now to the first mounting assembly 52, the first mounting assembly 52 comprises a carriage 62 which is engagable with and vertically slidable in the direction of the arrows C and D between the first support members 33 for providing vertical movement of the carcass engaging disc 54 substantially longitudinally relative to the carcass side 4 for moving the carcass engaging disc 54 from one rib to the next. The carriage 62 comprises a pair of cross members 63 joined by side members 64 and 65. Bearings 56 rotatable on brackets 67 mounted on the side members 64 and 65 rollably engage the first support members 33 for locating and guiding of the carriage 62 between the first support members 33. A pair of drive chains 68 around sprockets 69 and 70 fast on shafts 71 and 72, respectively, are anchored at their respective ends 73 and 74 by anchor brackets (not shown) to the cross members 63 of the carriage 62. The shafts 71 and 72 are rotatably mounted in bearings 76 secured to the first support members 33. Third drive means comprising an hydraulically powered drive motor 77 illustrated in block representation is mounted on the side member 17 and drives the shaft 71 for in turn moving the carriage 62 in the direction of the arrows C and D in the general vertical direction.

A pair of support arms 80 extending inwardly from the carriage 62 into the main support framework 15 mount the housing 51 and in turn the carrier arm 50 to the carriage 62, see in particular FIGS. 3 to 5. A spindle 82 extending between and pivotally mounted in bearings (not shown) in the support arms 80 defines a main vertically extending pivot axis 83 about which the carrier arm 50 is pivotal. A mounting bracket 84 extending from the spindle 82 rigidly connects the housing 51 to the spindle 82. A second drive means comprising a double acting second hydraulic ram 85 pivots the housing 51, and in turn, the carrier arm 50 about the main pivot axis 83 for moving the carcass engaging disc 54 in a horizontal arc. Accordingly, when the carcass engaging disc 54 is in engagement with the double membrane 8 between the ribs 3, the carcass engaging disc 54 moves along a path of movement in the direction of the arrows G and H which extends substantially parallel to the ribs 3, and substantially follows the natural curvature of the ribs 3. Thus, when the carcass engaging disc 54 is urged into the meat between the ribs 3 the double membrane is ruptured along the join line 11 and the meat is urged from at least one if not two of the adjacent ribs 3 by the carcass engaging disc 54. The second ram 85 comprises a cylindrical housing 86 which is pivotally connected by a pair of pivot brackets 87 to a mounting 88 extending between the support arms 80. A piston rod 89 extending from the cylindrical housing 86 is pivotally connected to the housing 51 by a pair of pivot brackets 90.

Returning to the carrier arm 50 and the connecting bracket 60 which connects the carrier arm 50 to the piston rods 59 of the ram 57, a fourth drive means comprising an hydraulic motor 91 illustrated in block representation is mounted on the connecting bracket 60 for pivoting the carrier arm 50 about its longitudinal axis for in turn permitting the disposition, in other words, the angle of attack of the carcass engaging disc 54 relative to the carcass side 4 to be altered. Although the connecting bracket 60 is located in a fixed position on the carrier arm 50, the carrier arm 50 is rotatable in a bearing (not shown) in the connected bracket 60. Such rigid longitudinal mounting and rotatable mounting may be achieved in many ways which will be well known to those skilled in the art. Typically, the bearing (not shown) may be rigidly located in the connecting bracket 60 and on the carrier arm 50 by circlips engaging respective grooves in the connecting bracket 60 and the carrier arm 50. A drive chain 92 around sprockets 93 on the carrier arm 50 and a drive shaft 94 of the hydraulic motor 91 transmits drive from the hydraulic motor 91 to the carrier arm 50 for pivoting the carrier arm 50 in the housing 51. In this embodiment of the invention the rotational axis 95 of the spindle 55 carrying the carcass engaging disc 54 is disposed at an angle of approximately 30° to the main pivot axis 83 when the spindle 55 and the main pivot axis 83 lie in the same plane.

Returning now to the second mounting assembly 36 for mounting the clamp 37 to the second support member 34, the second mounting assembly 36 comprises an elongated mounting bracket 97 rigidly secured to the second support member 34, see in particular FIGS. 6 to 11. A pair of spaced apart mounting members 98 extend rigidly from the mounting bracket 97 inwardly into the main support framework 15, and pivotally carry a pair of spindles 99 extending from a carrier housing 100. The spindles 99 define a vertically extending second secondary pivot axis 102 about which the clamp 37 is pivotal for aligning the ribs 3 of the carcass side 4 with the path of movement of the carcass engaging disc 54. The spindles 99 are welded to and extend from the carrier housing 100 and are pivotally carried in bearings 103 located in the mounting members 98. A pivot shaft 105 extending from the abutment member 40 of the clamp 37 defines a horizontally extending first secondary pivot axis 106. The pivot shaft 105 is rotatably carried in the carrier housing 100 for pivoting the clamp 37 about the horizontal first secondary pivot axis 106, for aligning the ribs substantially horizontally to coincide, with the path of movement in the direction of the arrows G and H of the carcass engaging disc 54 between the ribs 3.

A fifth drive means comprising a double acting fifth hydraulic ram 107 mounted between the carrier housing 100 and the abutment member 40 of the clamp 37 pivots the clamp 37 about the first secondary pivot axis 106. The stroke of the fifth hydraulic ram 107 is sufficient to pivot the carcass abutment member 40 +/−50° on each side of the vertical. The fifth hydraulic ram 107 comprises a cylindrical housing 108 which is pivotally connected to the carrier housing 100 by a pair of pivot mounting brackets 109. A piston rod 110 extending from the cylindrical housing 108 is pivotally connected by a pair of pivot mounting brackets 111 to a mounting member 112 rigidly extending from the abutment member 40.

A sixth drive means, namely, a double acting sixth hydraulic ram 114 connected between the carrier housing 100 and the mounting bracket 97 pivots the carrier housing 100, and in turn the clamp 37 about the second secondary pivot axis 102. A pair of pivot mounting brackets 115 pivotally connects a cylindrical housing 116 of the ram 114 to the mounting bracket 97, while a pair of pivot mounting brackets 117 pivotally connects a piston rod 118 of the hydraulic ram 114 to the carrier housing 100.

As can be seen the clamp 37 supports the carcass side 4 within the main support framework 15 between the abutment member 40 and the carcass engaging disc 54 carried on the carrier arm 50 so that the carcass side 4 is supported by the abutment member 40 of the clamp 37 against the action of the carcass engaging disc 54 rupturing the double membrane 8 and urging the meat away from the ribs 3.

Returning now to the conveyor track 28, the conveyor track 28 would in general be suspended from the ceiling of a building. Each roller carrier element 29 comprises a support member 120 depending downwardly and supported on an axle 121 which is rigidly connected to the support member 120, see FIGS. 12 to 14. A roller 122 is rotatably mounted on the axle 121 for rotatably carrying the support member 120 on the conveyor track 28. A guide member 123 rigidly connected to the axle 121 extends downwardly therefrom, and co-operates with the support member 120 for guiding and retaining the roller 122 on the conveyor track 28. A hook 124 is mounted at the lower end of the support member 120 for engaging and supporting a carcass side 4. The conveyor track 28 extend into the main support framework 15 through the input opening 30 and the output opening 31.

A receiving means, namely, a track portion 125 is mounted on the abutment member 40 of the clamp 37 and co-operates with the conveyor track 28 adjacent the input opening 30 and the output opening 31 for receiving the carrier elements 29 from, and delivering the carrier elements 29 onto the conveyor track 28. In this way a carcass side 4 is conveyed directly from the conveyor track 28 to the clamp 37. Additionally, the carcass side 4 when clamped in the clamp 37 is also supported on a carrier element 29 which is engaged on the track portion 125. This is described in more detail below. The track portion 125 is releasably engagable and alignable with the conveyor track 28 to facilitate pivoting of the clamp 37 about the first and second secondary pivot axes 102 and 106 defined by the spindles 99 and the pivot shaft 105, respectively. Track extensions 128a and 128b are pivotally connected by pivot pins 129 to the portions of the conveyor track 28 which extends into the main support framework 15 at the input opening 30 and the output opening 31, respectively. The track extensions 28 are pivotal from an aligned position illustrated in FIG. 1 aligning and connecting the conveyor track 28 to the track portion 125 to a disengaged position as illustrated by the track extension 128b in FIG. 12 with the conveyor track 28 disconnected from the track portion 125 to facilitate pivoting of the clamp 37 about the secondary pivot axes 102 and 106. Double acting hydraulic rams 130 pivotally connected to brackets 131 and 132 which extend from the conveyor track 28 and the track extensions 128, respectively, pivot the track extensions 128 for respectively connecting and disconnecting the conveyor track 28 with the track portion 125.

Retaining means for retaining a carrier element 29 located on the track portion 125 while a carcass side 4 is clamped in the clamp 37 comprises a retaining member 135 of inverted U-shape carried on a double acting hydraulic ram 136. A mounting framework 137 extending from the track portion 125 carries the ram 136. A cylindrical housing 139 of the ram 136 is rigidly secured to the framework 137. The retaining member 135 is secured to a piston rod 140 extending from the cylindrical housing 139 of the ram 136. The retaining member 135 is operable by the ram 136 between a retaining position illustrated in FIG. 12 engaging the roller 122 of the carrier element 29 for retaining the roller carrier element 29 located on the track portion 125 to a released position illustrated in FIG. 13 with the retaining member 135 raised above the track portion 125 to permit free rolling of the carrier element 29 along the track portion 125.

Valves (not shown) are provided for supplying hydraulic fluid to the rams 46, 57, 85, 107, 114, 130 and 136. An hydraulic valve is also provided for supplying hydraulic fluid to the hydraulic motors 77 and 91. Such valves and their operation will be well known to those skilled in the art. In general, it is envisaged that the valves will be solenoid operated and suitable control circuitry will be provided for operating the valve. Controls (not shown) are also provided for operating the valves for operating the rams and the motors in the appropriate sequence to operate the apparatus 1. Such controls may be partly manual and partly automatically operated. However, it is envisaged that the ram 57 for moving the carrier arm 50 for bringing the carcass engaging disc 54 into and out of engagement with the carcass side 4 will be manually operated, as will the ram 85 for pivoting the carrier arm 50 about the main pivot axis 83. The rams 107 and 114 may also be manually operated for pivoting the clamp 37 about the secondary pivot axes 102 and 106. In all cases, the manual operation of these rams will be carried out through the valves associated with the respective rams. It is envisaged that sensors may be provided on the track portion 125 for sensing when a carrier element 29 is located beneath the retaining member 135. The ram 136 for operating the retaining member 135 may be automatically operable in response to the sensor. The rams 130, in general, would be operated in response to the sensor. The ram 46 for operating the clamping member 41 may also be operated in response to the sensor, although as discussed above the ram 46 may also be manually operated. The drive motor 77 may be manually or automatically operated for moving the carriage 62 upwardly and/or downwardly, as may the motor 91.

In use, a carcass side 4 suspended on a roller carrier element 29 is moved along the conveyor track 28 into the clamp 37. While the roller carrier element 29 is being moved along the conveyor track 28 onto the track portion 125, the track extensions 128 are in the aligned position and the retaining member 135 is in the released position. On the roller carrier element 29 rolling onto the track portion 125, and being aligned with the retaining member 135, the retaining member 135 under the action of the ram 136 is lowered into the retaining position for retaining the carrier element 29 located on the track portion 125. The carcass side 4 is manipulated so that the locating member 47 engages the shoulder portion 48 of the carcass side 4. The clamping member 41 is pivoted by the ram 46 into engagement with the spine portion 6 of the carcass side 4 for clamping and retaining the carcass side 4 supported in the clamp 37. The track extensions 128a and 128b are pivoted upwardly into the disengaged position by the rams 130 to facilitate pivoting of the clamp 37 about the secondary pivot axes 102 and 106. Under the action of the rams 107 and 114 the clamp 37 is pivoted about the respective secondary pivot axes 102 and 106 so that the ribs 3 extend substantially horizontally and lie in an arc substantially coinciding with the path of movement of the carcass engaging disc 54 in the direction of the arrows G and H. The carrier arm 50 is moved inwardly by the hydraulic ram 57 so that the carcass engaging disc 54 is relatively close to the inside of the carcass side 4 and adjacent the ribs 3. The position of the carriage 62 is adjusted by the drive motor 77 until the carcass engaging disc 54 is substantially adjacent the lowest of the ribs 3 of the carcass side 4.

The carcass engaging disc 54 is then urged in the direction of the arrow A into engagement with the join line 11 of the double membrane 8 on the lower side of the lowest rib 3. Simultaneously, as the carcass engaging disc 54 is being urged into engagement with the join lines 11, the housing 51 is pivoted about the main pivot axis 83 by the ram 85 so that the carcass engaging disc 54 engages the join line 11 adjacent the spine 6. The ram 57 is operated to urge the carcass engaging disc 54 further into the carcass side 2 for rupturing the double membrane 8 at the join line 11 and for then in turn urging the meat from the rib 3. Simultaneously, with the action of the ram 57 urging the carcass engaging disc 54 into engagement with the meat, the ram 85 commences pivoting of the housing 51 and in turn the carrier arm 50 in the direction of the arrow H so that the carcass engaging disc 54 follows a path of movement in the direction of the arrow H along the join line 11 for continuously and progressively rupturing the double membrane 8 and urging meat from the rib 3. When the carcass engaging member 54 has reached the end of the lowest rib 3 remote from the spine 6, the carrier arm 50, and in turn, the carcass engaging disc 54 is moved outwardly in the direction of the arrow B by the ram 57, so that the carcass engaging disc 54 disengages the carcass side 4. The drive motor 77 moves the carriage 62 a small distances upwardly in the direction of the arrow C so that the carcass engaging disc 54 is engaged with the join line 11 of the double membrane 8 on the upper side of the lowest rib 3. The carcass engaging disc 54 is again urged into engagement with the carcass side 4 to engage the double membrane 9 along the join line 11 on the upper side of the lowest rib 3, and the carcass engaging disc 54 is urged further into the carcass side 4 for rupturing the double membrane 8 and for urging the meat from the rib 3. Simultaneously, with this action, the housing 51, and in turn the carrier arm 50 is pivoted by the ram 85 about the main pivot axis 83 for moving the carcass engaging disc 54 along a path of movement in the direction of the arrow G for continuously and progressively rupturing the double membrane 8 and urging the meat 2 from the rib 3. The ram 85 pivots the carrier arm 50 until the carcass engaging disc 54 is adjacent the spine 6. At the end of this movement, the meat 2 is separated from the lowest rib 3. The carriage 62 is again raised a small distance by the drive motor 77 and the carcass engaging disc 54 is aligned with the join line 11 above the second lowest rib 3. And the operation of the carrier arm 15 and in turn the carcass engaging disc 54 is repeated. The action of the carcass engaging disc 54 on the double membrane 8 along the join lines 11 and on the meat 2 relative to the rib 3 is illustrated in FIGS. 15 and 16. In FIG. 15 the carcass engaging disc 54 is being brought into engagement with the join line 11 of the double membrane 8 between a pair of ribs 3. In FIG. 16 portion of the meat 2 is illustrated having been urged away and detached from some of the ribs 3, and the carcass engaging disc 54 is illustrated being urged between a pair of ribs 3 and rupturing the double membrane 8 along the join line 11, and also urging the meat 2 from the adjacent the rib 3.

While the carcass engaging disc 54 is moving along its path of movement in the direction of the arrows G and H adjacent the ribs 3, where necessary, the carrier arm 50 may be moved inwardly or outwardly in the housing 51 by the ram 57 so that the carcass engaging disc 54 is adequately urged and applies sufficient force against the meat 2 for disengaging the meat 2 from the ribs 3. Additionally, to compensate for the fact that the radius of the ribs 3 may alter along their length, the clamp 37 may be pivoted about the vertical second secondary pivot axis 102 to ensure adequate and substantially constant pressure of the carcass engaging disc 54 on the meat 2.

To compensate for the fact that all the ribs 3 may not be parallel to each other, the clamp 37 may be pivoted about the horizontal first secondary pivot axis 106 as the carcass engaging disc 54 is being moved progressively upwardly of the carcass side 4, so that the join line 11 along which the carcass engaging disc 54 is moving will be parallel and will coincide with the horizontal path of movement of the carcass engaging disc 54.

Additionally, both before commencement of rupturing of the double membrane 8 and during rupturing, the angle of attack of the carcass engaging disc 54 is adjusted by the hydraulic motor 91 to minimize the rupturing force necessary for rupturing the double membrane 8. Additionally, the angle of attack of the carcass engaging disc 54 may be adjusted so that the carcass engaging disc 54 acts against an edge of the rib 3 as can be seen in FIGS. 15 and 16. This facilitates rupturing of the double membrane 8. If desired the carcass engaging disc 54 may be passed along each side of a rib 3 so that it acts on and co-operates with opposite side edges of the rib 3 for rupturing the membrane 8. This would require two passes of the carcass engaging disc 54 between each pair of ribs 3. Although in most cases a single pass between each pair of ribs will be sufficient for rupturing the double membrane 8 and urging the meat 2 from the adjacent ribs 3.

On the meat 2 having been urged away from all the ribs 3, the carrier arm 50 is operated by the ram 57 for moving the carcass engaging disc 54 away from the carcass side 4 in the direction of the arrow B. The clamp 37 is pivoted about the secondary pivot axes 102 and 106 until the carcass abutment member 40 is vertical and the track portion 125 is aligned with the conveyor track 28. The track extensions 128a and 128b are pivoted into the aligned position to connect the track portion 125 with the conveyor track 28. The clamping member 41 is released into the open position and the retaining member 135 is released from the roller carrier element 29. The carcass side 4 on the roller carrier element 29 is transferred from the track portion 125 onto the conveyor track 28 and through the output opening 31. The meat 2 detached from the ribs 3 remains hanging on the other bones of the carcass side 4, and is then readily easily removed and separated from the spine 6 and other bones by an operator, and removed from the carcass side 4.

The apparatus 1 is then ready for the next carcass side 4 which is moved into the main support framework 15 through the input opening 30 on the conveyor track 28.

In certain cases, it is envisaged that the double membrane 8 may be manually cut by a knife or other suitable cutting implement along the join lines 11 between the ribs 3 prior to the carcass side 4 being delivered into the main support framework 15. This would assist in the subsequent rupturing of the double membrane 8 and the disengagement of the meat from the ribs 3.

Referring now to FIGS. 17 to 20 there is illustrated an alternative construction of second mounting assembly 150 for mounting the clamp 37 to the second mounting member 34. The second mounting assembly 150 is somewhat similar to the second mounting assembly 36 and similar components are identified by the same reference numerals. The second mounting assembly 150 mounts the clamp 37 to the second support member 34 so that the clamp 37 is pivotal about a horizontal first secondary pivot axis 106 and a vertical second secondary pivot axis 102. The second mounting assembly 150 comprises a mounting bracket 97 which is secured to the second support member 34. Mounting members 98 pivotally carry a spindle 151 which is rotatable in bearings 154 in the mounting members 98 for pivoting the clamp 37 about the vertical second secondary pivot axis 102 which is defined by the spindle 151. A circular housing 153 is secured to the spindle 151 by welding and rotatably carries a circular disc 152 which defines the first secondary pivot axis 106. A pivot shaft 105 rigidly extending from the abutment member 40 of the clamp 37 is coaxially welded to the circular disc 152 for accommodating pivoting of the clamp 37 about the horizontal first secondary pivot axis 106. An hydraulic ram 114 pivotally connected by brackets 155 and 156 to the mounting bracket 97 and the circular housing 151, respectively, pivots the circular housing 151 and in turn the clamp 37 about the vertical second secondary pivot axis 102. An hydraulic ram 107 pivotally connected to the circular housing 153 and the abutment member 40 by brackets 157 and 158, respectively, pivots the clamp 37 about the horizontal first secondary pivot axis 106. Otherwise operation of the second mounting assembly 150 is similar to that of the second mounting assembly 36.

While the main support framework has been described as comprising a first support means, namely, a pair of first support members and a second support means, namely, a second support member, any other construction of main support framework and first and second support means may be provided. Indeed, in certain cases, it is envisaged that the main support framework need only include the first and second support means. In which case, it is envisaged that the first support means and second support means would be rigidly mounted relative to each other, for example, rigidly mounted on the floor of a building, or indeed, in certain cases, may extend between the floor and ceiling of a building. Needless to say, first and second support means other than those described may be used.

While the carcass engaging means has been described as comprising a circular disc rotatably mounted on a carrier arm, any other suitable carcass engaging means may be provided. Indeed, it is envisaged in certain cases that the carcass engaging means may not be rotatably mounted on a carrier arm, and indeed, in certain cases, it is envisaged that the carcass engaging means where it is mounted on the carrier arm may be provided by portion of the carrier arm. It will also be appreciated that while it is advantageous, it is not essential that the movement of the carrier disc along the path of movement be provided by pivoting the carrier arm about a main pivot axis. Needless to say, it is not essential that where the carcass engaging means and the carrier arm are pivotal about the main pivot axis, that the main pivot axis be vertical. The main pivot axis may be at any angle to the horizontal or vertical, and indeed in certain cases, may be horizontal. In such cases, the orientation of the carcass would be arranged so that the movement of the carcass engaging means would be along a path substantially coinciding with the bone from which the meat is to be urged. Additionally, while the carcass engaging means has been described for both rupturing the membrane, and urging the meat from the bone, in certain cases, it is envisaged that the carcass engaging means may only urge the meat from the bone. It is not essential that the carcass engaging means should actually rupture the membrane. While the carcass engaging means has been described as engaging the double membrane along the side edge of the bone to facilitate rupturing, this in every case will not be essential. Indeed, in many cases, it is envisaged that the carcass engaging means may be extended between a pair of adjacent ribs and need not abut the side edges of the ribs. It will also be appreciated that while it is preferable it is not essential that the carcass engaging means be provided with a cutting edge. It will be appreciated by those skilled in the art that provided sufficient force is applied to the carcass engaging means between the ribs, or indeed, adjacent any other bone, the double membrane or single membrane as the case may be holding the meat to the bone where a membrane exists would rupture under sufficient force.

While it is preferable, it is not essential that the carrier arm be pivotally mounted in the cylindrical housing.

It will also be appreciated that it is not essential that the clamp means be pivotal about any axis relative to the second mounting means. The clamp means may be rigidly mounted to the main support means. In certain cases it is envisaged that where the clamp is pivotally mounted to the second support means, it may only be pivotally mounted about one axis.

Needless to say any other suitable drive means for moving the various components besides hydraulic rams, and hydraulic motors, may be provided.

It will also be appreciated that any other suitable clamp means may be provided.

While the apparatus has been described for urging meat from a rib of a carcass side, the apparatus may be used for urging meat from any other bone of any other part of a carcass of an animal. It will be appreciated that where the meat is to be removed from the bone of a small portion of a carcass, only that relevant portion of the carcass would be clamped in the clamp means, and in such cases, an alternatively shaped clamp means may by provided should this be necessary.

We claim:

1. Apparatus for separating meat (2) from ribs (3) of at least a portion of an animal carcass (4), the apparatus (1) comprising:

a main support means (15), a clamp means (37) mounted on the main support means (15) for holding and supporting the portion of the animal carcass (4), a carrier means (50) mounted on the main support means (15), a carcass engaging disc (54) for engaging the carcass portion (4) for urging the meat (2) from the ribs (3), the carcass engaging disc (54) being rotatably mounted about a rotational axis (55,95) on the carrier means (37), and defining a peripheral cutting edge (56) for rupturing a membrane (8) which retains the meat (2) to the ribs (3), at least one of the carrier means (50) and the clamp means (37) being moveable relative to the other of the carrier means (50) and the clamp means (37) for urging the carcass engaging disc (54) into engagement with the carcass portion (4) for rupturing the membrane (8), and for urging the meat (2) from the ribs (3), a first drive means (57) being provided for moving the moveable one of the carrier means (50) and the clamp means (37), for engaging the carcass engaging disc (54) with the carcass portion (4), and a second drive means (85) being provided for moving the carrier means (50) relative to the main support means (15) for in turn urging the carcass engaging disc (54) along respective paths of movement along the respective ribs (3) for progressively rupturing the membrane (8) along the ribs (3) and for progressively urging the meat (2) from the ribs (3) as the carcass engaging disc (54) is being urged into the carcass portion (4).

2. Apparatus as claimed in claim 1 characterised in that the carrier means (50) is movable relative to the main support means (15) towards the clamp means (37) for engaging and urging the carcass engaging disc (54) into the carcass portion (4).

3. Apparatus as claimed in claim 1 characterised in that the carrier means (50) is movable transversely of the ribs (3) for in turn moving the carcass engaging disc (54) transversely of the ribs (3) from one rib (3) to another adjacent rib (3), and a third drive means (77) is provided for moving the carrier means (50) transversely of the ribs (3).

4. Apparatus as claimed in claim 1 characterised in that the carrier means (50) comprises an elongated carrier arm (50), and the carcass engaging disc (54) is rotatably carried on one end of the carrier arm (50), the carrier arm (50) being mounted on the main support means (15) by a first mounting means (52), and being pivotally connected to the first mounting means (52) about a main pivot axis (83), the main pivot axis (83) being spaced apart from the carcass engaging disc (54) for accommodating movement of the carcass engaging disc (54) along the path of movement along the ribs (3) about the main pivot axis (83), the carrier arm (50)

being pivoted about the main pivot axis (83) by the second drive means (85).

5. Apparatus as claimed in claim 4 characterized in that the carrier arm (50) is longitudinally slidable in a housing (51) for accommodating movement of the carcass engaging disc (54) towards the clamp means (37), the housing (51) being pivotally connected to the first mounting means (52) about the main pivot axis (83), and the carrier arm (50) being movable along its longitudinal axis in the housing (51) by the first drive means (57).

6. Apparatus as claimed in claim 5 characterized in that the carrier arm (50) is pivotally mounted in the housing (51) about its longitudinal axis for altering the disposition of the carcass engaging disc (54) relative to the carcass portion (4), a fourth drive means (91) being provided for pivoting the carrier arm (50) in the housing (51).

7. Apparatus as claimed in claim 6 characterized in that of the carcass engaging disc (54) is disposed with its rotational axis (55,95) extending in a direction which lies between being parallel to the main pivot axis (83) and being at an angle of 75° to the main pivot axis (83) widen the rotational axis (55,95) and the main pivot axis (83) lie in a common plane.

8. Apparatus as claimed in claim 7 characterized in that the rotational axis (55,95) of the carcass engaging disc (54) extends at an angle of approximately 30° to the main pivot axis (83) when the rotational axis (55,95) and the main pivot axis (83) lie in a common plane.

9. Apparatus as claimed in claim 4 characterized in that the clamp means (37) is pivotally connected to the main support means (15) about a first secondary pivot axis (106) which extends perpendicularly to the main pivot axis (83) for aligning a rib (3) with the path of movement of the carcass engaging disc (54), the clamp means (37) being pivotally connected to the main support means (15) about a second secondary pivot axis (102) extending perpendicularly to the first secondary pivot axis (106) for aligning the carcass portion (4) with the path of movement of the carcass engaging disc (54).

10. Apparatus as claimed in claim 1 characterised in that the carcass engaging disc (54) is a circular disc (54), the rotational axis (55,95) of the carcass engaging disc (54) coinciding with a central axis of the carcass engaging disc (54).

11. Apparatus as claimed in claim 1 characterized in that the clamp means (37) is for supporting a carcass side (4).

12. A method for separating meat from ribs (3) of a portion of an animal carcass (4), the method comprising the steps of clamping the carcass portion (4) in a clamp means (37) located in a main support means (15) with the carcass portion (4) held and supported in take clamp means (37), urging at least one of the clamp means (37) and a carrier means (50) towards the other of the clamp means (37) and the carrier means (50), for in turn urging a carcass engaging disc (54) into engagement with the carcass portion (4) for urging meat (2) from the ribs (3), the carcass engaging disc (54) being rotatably mounted on the carrier means (50) about a rotational axis (55,95), and defining a peripheral cutting edge (56) for rupturing a membrane (8) which retains the meat (2) to the ribs (3), and moving the carrier means (50) for in turn moving the carcass engaging disc (54) along respective paths of movement along the respective ribs (3) for progressively rupturing the membrane (8) along the ribs (3), and for progressively urging the meat (2) from the ribs (3) as the carcass engaging disc (54) is being urged into the carcass portion (4).

* * * * *